United States Patent [19]

Kainer et al.

[11] Patent Number: 4,771,026

[45] Date of Patent: Sep. 13, 1988

[54] CATALYST IN THE FORM OF A PLATE FOR NITROGEN OXIDE REDUCTION IN EXHAUST GASES

[75] Inventors: Hartmut Kainer, Wiesbaden; Daniel Grimm, Schlangenbad-Bärstadt; Claus Flockenhaus, Essen; Karl-Heinrich Laue, Hattingen, all of Fed. Rep. of Germany

[73] Assignees: Didier-Werke AG, Wiesbaden; Didier Engineering GmbH, Essen, both of Fed. Rep. of Germany

[21] Appl. No.: 91,629

[22] Filed: Sep. 1, 1987

Related U.S. Application Data

[63] Continuation-in-part of Ser. No. 905,752, Sep. 9, 1986, and a continuation-in-part of Ser. No. 904,175, Sep. 5, 1986, Pat. No. 4,742,036, and a continuation-in-part of Ser. No. 887,366, Jul. 17, 1986, abandoned, and a continuation-in-part of Ser. No. 831,142, Feb. 19, 1986, Pat. No. 4,695,559, and a continuation-in-part of Ser. No. 86,421, Aug. 17, 1987.

[30] Foreign Application Priority Data

Oct. 2, 1986 [DE] Fed. Rep. of Germany ....... 3633515

[51] Int. Cl.[4] .................. B01J 27/043; B01J 27/053; B01J 27/185; B01J 27/188

[52] U.S. Cl. ..................... 502/210; 502/213; 502/217; 502/219; 502/221; 502/527

[58] Field of Search ............... 502/210, 213, 527, 219, 502/221

[56] References Cited

U.S. PATENT DOCUMENTS

| | | | |
|---|---|---|---|
| 948,947 | 2/1910 | Wrampelmeier | 502/338 |
| 4,364,842 | 12/1982 | McDaniel et al. | 502/210 |
| 4,446,250 | 5/1984 | Niwa et al. | 502/527 |
| 4,672,052 | 6/1987 | Wagener et al. | 502/527 |
| 4,695,559 | 9/1987 | Wagener et al. | 502/183 |
| 4,721,699 | 1/1988 | Wagener et al. | 502/527 |

Primary Examiner—Wayland Stallard
Attorney, Agent, or Firm—Nils H. Ljungman

[57] ABSTRACT

The invention relates to a catalyst in the form of a plate for nitrogen oxide reduction in exhaust gases manufactured by molding granular $Cr_2O_3$ or a mixture of granular $Fe_2O_3$ with $Cr_2O_3$ with phosphoric acid or sulphuric acid as binder, characterized by the fact that a combination is molded of separately prepared mixtures of $Cr_2O_3$ or ($Fe_2O_3+Cr_2O_3$) with phosphoric acid as binder, and of $Cr_2O_3$ or ($Fe_2O_3+Cr_2O_3$) with sulphuric acid as binder.

20 Claims, 3 Drawing Sheets

● $H_3PO_4$

○ $H_2SO_4$

● H₃PO₄

○ H₂SO₄

● H₃PO₄

○ H₂SO₄

CATALYST IN THE FORM OF A PLATE FOR NITROGEN OXIDE REDUCTION IN EXHAUST GASES

This application is a continuation-in-part of co-pending application Ser. No. 905,752, filed Sept. 9, 1986, entitled "Process for the Manufacture of Catalyst Molding", which corresponds to Federal Republic of Germany Patent Application No. P 35 32 207.1, filed Sept. 10, 1985; a continuation-in-part of application Ser. No. 904,175, filed on Sept. 5, 1986, now U.S. Pat. No. 4,742,036 entitled "Catalyst Plate", which corresponds to Federal Republic of Germany Patent Application No. P 35 31 651.9, filed on Sept. 5, 1985; a continuation-in-part of co-pending application Ser. No. 887,366, filed on July 17, 1986, entitled "Process For The Production Of Catalysts For The Reduction Of Nitrogen Oxides From Exhaust Gases And Similar Chemical Air Cleaning Processes", which corresponds to Federal Republic of Germany Patent Application No. P 35 26 383 0, filed on July 24, 1985; a continuation- in-part of co-pending application Ser. No. 831,142, filed on Feb. 19, 1986, now U.S. Pat. No. 4,695,559 entitled "Catalyst for the Selective Reduction of Nitrogen Oxides in Waste Gases And Process For the Manufacture and Use of Such a Catalyst", which corresponds to Federal Republic of Germany Patent Application No. P 35 05 648.7, filed on Feb. 19, 1985; and also a continuation-in-part of co-pending U.S. Ser. No. 086,421, filed on Aug. 17, 1987, entitled "Catalyst in the Form of a Plate for Nitrogen Oxide Reduction in Exhaust Gases", which corresponds to Federal Republic of Germany Patent Application No. P 36 33 515.0, filed on Oct. 2, 1986, all of which are assigned to at least one of the same assignees as the instant application. All of the above-identified co-pending applications are hereby expressly incorporated by reference into the present application as if their contents were set forth in their entirety herein.

BACKGROUND OF THE INVENTION

1. Field of the Invention

The present invention relates to a catalyst in the form of a plate for nitrogen oxide reduction in exhaust gases manufactured by molding granular $Cr_2O_3$ or a mixture of granular $Fe_2O_3$ with $Cr_2O_3$ with phosphoric acid or sulphuric acid as binder.

2. Description of the Prior Art

Catalyst moldings are used for the reduction of nitrogen oxides in exhaust gases produced by combustion equipment. According to the prior art, the quantity of nitrogen oxides can be reduced by means of reducing agents such as CO, $NH_3$, $CH_4$, $H_2$, etc. The prior art also includes catalyst materials such as $TiO_2$, $WO_3$, $V_2O_5$, $MoO_3$, $Cr_2O_3$, $Fe_2O_3$ or mixtures of these materials, as well as catalytic additives such as $WO_3$, $V_2O_5$, $MoO_2$ and $Cr_2O_3$ as active substances. Additives in highly-pure form for use with carrier substances are expensive, and, because of their high activity, are sensitive to aging. They are also difficult to dispose of. The recovery of the valuable active substances is naturally desirable, but it entails a significant expense for equipment, which therefore has an adverse effect on the economy of the process.

Attempts have already been made to manufacture $Fe_2O_3$ catalyst material using sulphuric acid as a binder. It has thereby been shown that only the sulphuric acid binding leads to a high activity, but it also produces an excessive sensitivity to water, which causes the moldings to absorb water and become soft. An example of sulphuric acid being used as a binder is to be found in U.S. Pat. No. 948,947, entitled "Catalytic and Process of Making Same", which is incorporated by reference as if the entire contents thereof were fully set forth herein.

In the manufacture of catalyst moldings, it is frequently to produce thin webs for plates, honeycombs, tubes and other configurations, which means that sufficient strength must be assured. This normally requires relatively high pressures with a homogeneous pressure distribution. Up to now, it has been impossible to achieve these characteristics without a major expenditure for equipment. Therefore, molding manufacturing processes of the prior art suffer from the disadvantage that the molding must be removed from the mold very carefully and must be subjected to a long tempering process, to achieve a strong and durable shape. Attempts have also been made to use intermittent molding techniques or calendering. But here again, it turns out that the molding is either impossible to work with, or can only be worked with with great difficulty. Specifically, it is difficult to remove the molding from the mold, and undesirably long tempering times are necessary.

Catalysts are known, specifically, for example, catalysts containing $Fe_2O_3$, $Cr_2O_3$ or $V_2O_5$. In terms of their action, however, these catalysts leave something to be desired.

Some examples of catalytic technology are found in U.S. Pat. No. 4,259,312, entitled "Process And Apparatus For Catalytically Reacting A Reducing Gas And Water Vapor"; U.S. Pat. No. 4,235,604, entitled "Method For Processing Coke Oven Gas"; and U.S. Pat. No. 4,049,777, entitled "Method Of Waste Gas Treatment", all of which are assigned the same assignee as the instant application.

Further examples of catalytic technology are found in U.S. Pat. No. 4,448,895, entitled "Process For Preparation Of Catalyst For Cleaning Exhaust Gases And Catalyst Prepared For The Process", and U.S. Pat. No. 4,503,162, entitled "Catalyst Systems For The Conversion Of Gases".

Examples of reactivation of catalysts useful in nitrogen oxide removal are described in U.S. Pat. No. 4,044,102, entitled "Method For Treating Exhaust Gases", and U.S. Pat. No. 4,043,939, entitled "Reactivation Of Catalysts Useful For Nitrogen Oxide Removal." All of the above-cited patents are incorporated herein by reference as if the texts thereof were fully set forth herein.

Co-pending Applications

Copending U.S. application Ser. No. 904,175 (corresponding to Federal Republic of Germany Patent Application No. P 35 31 651 9) and co-pending U.S. application Ser. No. 905,752 (corresponding to Federal Republic of Germany Patent Application No. P 35 32 207.1) describe $Fe_2O_3$ catalyst material plates which are manufactured using sulphuric acid or phosphoric acid as a binder. It has thereby been shown, however, that while sulphuric acid leads to a high activity, it also leads to considerable sensitivity to water, whereby the plates become soft due to water absorption. Conversely, phosphoric acid binder reduces the activity, but on the other hand leads to hard plates not sensitive to water. Combinations of phosphoric acid and sulphuric acid do not always lead to as satisfactory a catalytic effect as may be desired. Furthermore, the impregnation of catalyst plates containing phosphoric acid binder with sulphuric acid and vice versa sometimes gives only moderately good results for certain applications.

U.S. application Ser. Nos. 904,175 and 905,752 discuss using phosphoric acid as a binder. The phosphoric acid binder reduces activity, but produces hard moldings which are not sensitive to water. Mixtures of phosphoric acid and sulphuric acid lead to a catalyst action which is not always satisfactory. Even the saturation of catalyst moldings containing a phosphoric acid binder with sulphuric acid, and vice-versa, results in only moderate improvements.

OBJECT OF THE INVENTION

The object of the invention is to create a catalyst of the type described above, which on the one hand exhibits the highest possible activity with good strength, and on the other hand a low sensitivity to water.

BRIEF DESCRIPTION OF THE DRAWINGS

Advantageous embodiments of the present invention are illustrated in the accompanying drawings.

DESCRIPTION OF THE PREFERRED EMBODIMENTS

The object of the invention is achieved by molding a combination of separately prepared mixtures of $Cr_2O_3$ or ($Fe_2O_3+Cr_2O_3$) with phosphoric acid as binder, and of $Cr_2O_3$ or ($Fe_2O_3+Cr_2O_3$) with sulphuric acid as binder.

The catalyst plates have the advantage of a homogeneous catalyst combination and exhibit sufficient abrasion properties, which are desirable in catalyst plates.

In addition, it has been shown that a catalyst with high strength and activity using the same principle can be manufactured so that it is formed as a molding comprising layers, whereby the layers alternately including a mixture of $Cr_2O_3$ or ($Fe_2O_3+Cr_2O_3$) with phosphoric acid as binder and of a separately produced mixture of $Cr_2O_3$ or ($Fe_2O_3+Cr_2O_3$) with sulphuric acid as binder. Concentrations and proportions of the acids are disclosed infra. Due to this outer layer with sulphuric acid binder and the resulting softness, the desired abrasion properties during operation can be achieved.

In the outer layer, substances such as $V_2O_5$, $WO_3$, $Nb_2O_5$, $MnO$, etc., can be incorporated in the layers, in particular in the outer layer. With this procedure, only about half of the catalyst mass has to be doped.

Figure 1:
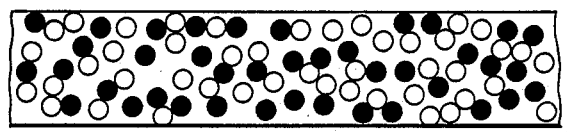
FIG. 1 shows one embodiment of a catalyst molding, which molding was molded from layers of existing moldings, whereby the black spots are intended to represent the catalyst material with phosphoric acid as binder, and the white spots represent sulphuric acid as binder.

In order to achieve the configuration of FIG. 1, the catalytic materials with their different binders can be mixed and then pressed or otherwise formed into a catalyst molding. The white dots preferably represent a mixture of $Fe_2O_3:Cr_2O_3$ equal to a ratio of about 4:1 parts by weight with about 0.2 parts by weight 80% sulphuric acid preferably mixed together uniformly, that is, 0.2 parts of acid to the one part of $Cr_2O_3$. The black dots preferably represent a mixture of $Fe_2O_3:Cr_2O_3$ equal to a ratio of about 4:1 parts by weight with about 0.2 parts by weight 70% phosphoric acid preferably mixed together uniformly, that is, 0.2 parts of acid to the one part of $Cr_2O_3$.

Figure 2:
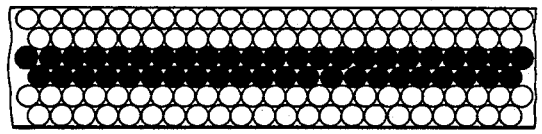
FIG. 2 shows another embodiment of a catalyst molding, whereby the inside layer consists of catalyst material with phosphoric acid as binder, and the two outside layers of catalyst material with sulphuric acid as binder.

In the configuration of FIG. 2, separate parts can be made, each from the catalyst with different binders, and then these parts can be joined together by, for example, pressing or otherwise, to form the catalytic molding therein.

One method of making a molded object would be to place a mixture A, containing sulphuric acid, into a mold and slightly pre-compress it, if necessary; then place a mixture B, containing phosphoric acid, into the mold on top of mixture A and then slightly pre-compress mixture B, if necessary; and then finally, place mixture A into the mold on top of mixture B and then compress the entire structure.

The following comprises the description of the preferred embodiments of the parent cases:

Moldings may be made from natural raw material (such as ore without preliminary grinding) containing $Fe_2O_3$, $Cr_2O_3$, or another such catalyst component, such as $TiO_2$ or $NbO_2$, $WO_3$, $V_2O_5$, or $MoO_3$, which is screened to a grain size below approximately 0.25 mm. The screened basic mixture is thoroughly blended, and then preferably a concentrated sulphuric acid is added. This material mixture is then pressed into a molding in a hydraulic press with a pressure of approximately 500 bar. It has been shown that, as a result of the addition of the concentrated sulphuric acid, the materials $Al_2O_3$, $MgO$, $CaO$ and other similar materials which occur in the natural ore rapidly set and form a sulfated support element for the molding, which thereby receives sufficient stability for handling, even if the molding comprises relatively complicated and thin structures. The above-mentioned formation of $MgSO_4$, $CaSO_4$, etc., according to a process described in an embodiment of the invention, also prevents a reduction in the size of the micropores formed during manufacturing when the catalyst is exposed to exhaust gases containing sulphur trioxide. Unsuccessful attempts have been made in the past to control the size of these micropores, using $Fe_2O_3$ on aluminum oxide carrier.

It has been shown that approximately 20 to 60 ml, preferably 40 ml, of sulphuric acid can advantageously be added to 1000 g of screened basic mixture. This relatively small quantity of concentrated sulphuric acid can be used to make certain that the hygroscopic properties of the catalyst molding produced remain within acceptable limits.

In the process, additional strength can also be achieved through the use of phosphate binder by using a concentrated sulphuric acid which contains up to 10%, that is, only a relatively small proportion, of phosphoric acid. Such a measure is taken, however, at the expense of a certain deactivation of the catalyst components by blocking the voids, for example, in $Fe_2O_3/Fe_3O_4$ mixtures.

The manufacturing process proposed is preferably executed so that the basic mixture is applied to a plate-shaped support body, an external mold is placed on top of it and filled with basic material which is slightly compressed and scraped, another plate-shaped cover is placed on the mold, and this unit is subjected to the mold pressure. The mold can also exhibit spacers.

The support body and the cover are advantageously sprayed, before the basic material is placed inside, with a molding parting compound, preferably a material containing silicon.

The entire unit comprising the support body, the external mold and the cover can therefore be removed all at once from the press, and subjected as a unit to the drying and calcining process. The catalyst molding is thus not exposed to any stresses, as was the case with manufacturing processes of the prior art.

The drying is preferably done at approximately 150° C. for period of 5 to 500 minutes, and calcining is done at approximately 450° C., also for a period of approximately 5 to 500 minutes.

It also turns out to be particularly advantageous to leave the molding in the calcining furnace for approximately 1 to 24 hours after the calcining process, and removing it from the calcining furnace only after it has cooled to a temperature of between approximately 20° C. to 200° C. Then the finished, for example, plate-shaped, catalyst molding can be inserted into cartridges, and used in an electric power generation plant.

The catalyst moldings manufactured exhibit good control characteristics, high yields and a wide temperature range with high activity.

Methods of forming the moldings are well known in the prior art. Some recently published examples are found in U.S. Pat. Nos. 4,495,118, entitled "Ceramic Plates and Method For The Production Thereof"; 4,183,885, entitled "Quick Baking Process for Ceramic Products"; 4,092,092, entitled "Apparatus for Making Ceramic Articles"; 3,965,246, entitled "Process for the Production of Ammonia Using Aligned Catalyst Particles"; and 3,881,696, entitled "Catalyst for Cleaning Engine Exhaust Gases". All of the above-cited patents are incorporated by reference as if the entire contents thereof were fully set forth herein.

FIG. 1 shows one embodiment of a catalyst molding which was molded from layers of existing moldings, whereby the black spots are intended to represent the catalyst material with phosphoric acid as binder, and the white spots represent sulphuric acid as binder.

FIG. 2 shows another embodiment of a catalyst molding, whereby the inside layer consists of catalyst material with phosphoric acid as binder, and the two outside layers of catalyst material with sulphuric acid as binder.

Figure 3:
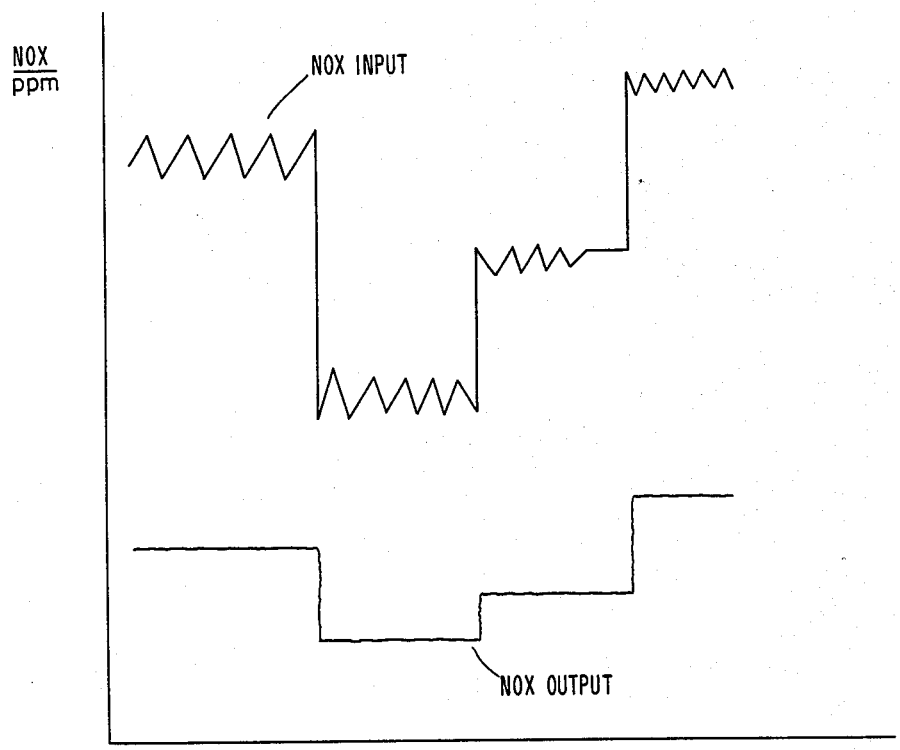
FIG. 3 shows how the catalyst largely compensates for fluctuations in the nitrogen oxide input concentration.
Figure 4:
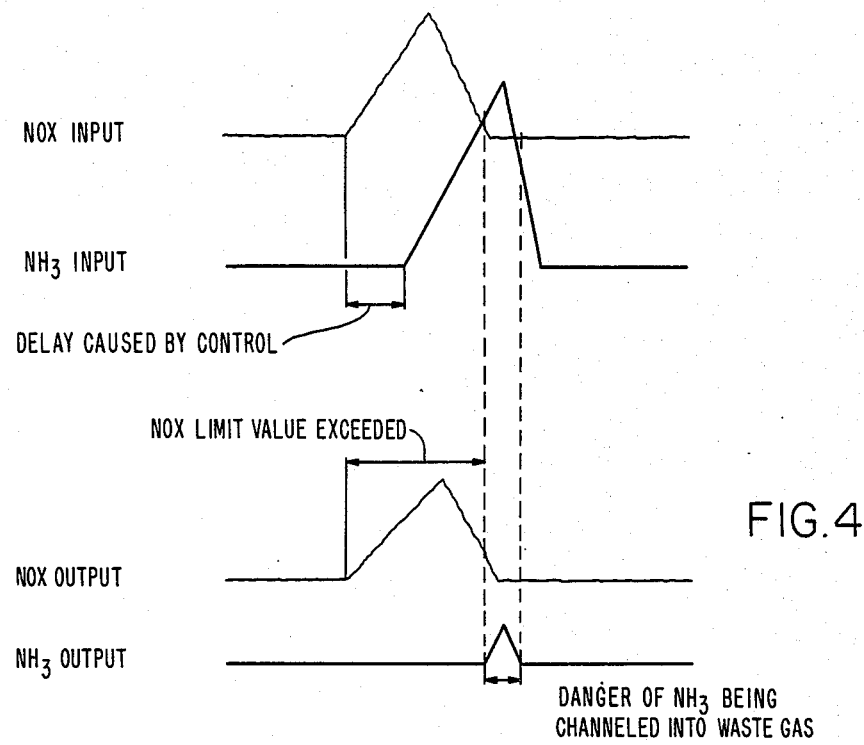
FIG. 4 shows how the channeling of ammonia into the waste gas can be prevented with the catalyst.
Figure 5:
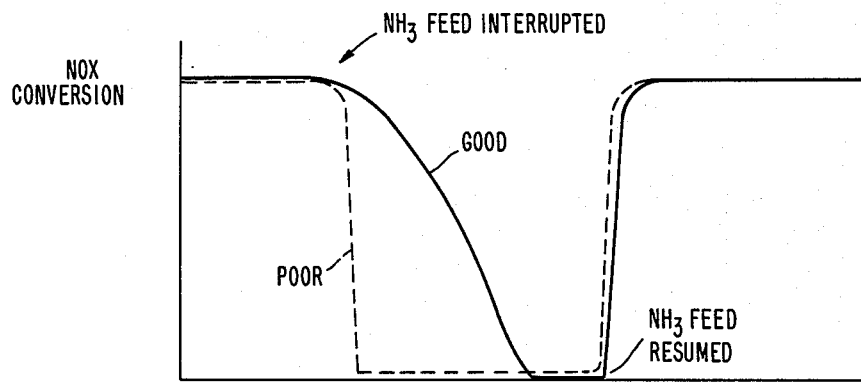
FIG. 5 shows the control action of a catalyst because of the high sorption capability for ammonia.

The catalyst, whose properties are shown in FIGS. 3 through 5, retains an extraordinarily good control action, in addition to its known high activity and selectivity. Its possible applications, moreover, are very economical. The good control action is specifically determined by the relatively high sorption capability for ammonia, so that even with significant nitrogen oxide fluctuations in the waste gas to be purified, the danger of ammonia being channeled into the gas can be prevented, which would otherwise lead to problems in the downstream equipment. Because of the low oxidation capability of the catalyst described by the invention, there is no further oxidation of the sulfur dioxide, ammonia, or similar substances found in the gas to be purified. The sulfur trioxide, which occurs when sulfur dioxide is further oxidized, would otherwise be converted to sulfates with the ammonia in the waste gas stream. The oxidation of the ammonia added for the reduction to water and nitrogen, which does not take place because of the low oxidation capability of the catalyst, reduces the consumption of operating materials, so that a more economical operation of a purification process can be achieved.

For most applications of the catalyst, it is particularly advantageous if the sorption capability for ammonia is high enough so that in a temperature range of between approximately 280° C. and 450° C., and in spite of nitrogen oxide fluctuations of up to 200 milligrams per cubic meter and essentially constant ammonia feed, no ammonia is channeled into the waste gas.

In another configuration, it is advantageous if the activity and selectivity regarding the nitrogen oxide conversion are essentially constant in the temperature range between 280° C. and 450° C. and the oxidation capability is negligible.

According to another feature, the catalyst is characterized by macropores between approximately 0.5 and 50 microns.

The characteristics of the invention described above can be achieved, for example, by a mixture of substances, which exhibit the basic substances A and B, whereby the basic substance A comprises the following components:

89 to 92 percent by weight of $Fe_2O_3$;
3 to 4 percent by weight of $Fe_3O_4$;
4 to 5 percent by weight of $SiO_2$;
1 to 2 percent by weight of $Al_2O_3$;
0.01 to 0.2 percent by weight of $MnO$;
0.01 to 0.03 percent by weight of $CaO$;
0.01 to 0.02 percent by weight of $MgO$; and
0.7 to 0.001 percent by weight of $V_2O_5$, and the basic substance B comprises the following components:

30 to 48 percent by weight of $Cr_2O_3$;
12 to 30 percent by weight of $Fe_2O_3$;
10 to 30 percent by weight of $Al_2O_3$;
10 to 25 percent by weight of $MgO$; and
1 to 5 percent by weight of $SiO_2$.

Surprisingly, such mixtures of substances have high activity and selectivity for nitrogen oxide conversion, high sorption capability for ammonia and low oxidation capacity for sulfur dioxide and ammonia, especially in the temperature range of between approximately 350° C. and 450° C. This is all the more surprising, since the known catalysts which contain $Fe_2O_3/Cr_2O_3$, of course, have relatively high activity and selectivity, as do combinations of $V_2O_5$ and $TiO_2$ in mixtures with $WO_3$. But there sorption capability with regard to ammonia is low, so that there is a poor control characteristic in the presence of severe and spontaneous nitrogen oxide fluctuations. The characteristics of the mixture of basic substances A and B are, therefore, surprising, because mixtures of $V_2O_5$ and $TiO_2$ already exhibit a significant oxidation-promotion effect in a temperature range from 350° C. to 450° C., which could only be limited by the addition of inhibitors, or else such a catalyst could not be used for gases containing sulfur. In the temperature range from 280° C. to 350° C., $V_2O_5/TiO_2$ catalysts exhibit relatively high activity and selectivity with regard to the nitrogen oxide conversion, as well as a low tendency to oxidation. They also exhibit a low sorption capability with regard to ammonia, so that their control characteristic is poor. $Fe_2O_3/Cr_2O_3$ mixtures exhibit a high sorption capability at temperatures from 280° C. to 350° C., which results in a good control behavior, but their activity is low.

Furthermore, it has been shown that, surprisingly, the activity of the mixture of substances can be significantly increased by sulfatization.

The same is true for a temperature range from 280° C. to 350° C., if the $V_2O_5$ is finely divided in the mixture.

According to one feature of the process, sufficient strength and water-resistance can be imparted to the dry mixture of substances of the catalyst if it is present in a grain size of less than 0.2 mm and bonded with a phosphate acid such as phosphoric acid.

The activation of the catalyst is carried out according to another characteristic feature, preferably by means of sulphuric acid or $VOSO_4$ by saturation.

A heat treatment, that is, calcination, of the mixture of substances is preferably done at 200° C. to 500° C., whereby temperature increase rates of preferably between about 500° C. per minute and about 1° C. per minute are used.

It is also proposed that fiber material of glass and/or ceramic and/or carbon and/or steel be added to the mixture of substances, which fiber material is used as a support structure during the molding of the mixture of substances into moldings.

The molding of the mixture of substances is preferably done isostatically into smooth or corrugated plates.

It has thereby been shown to be particularly advantageous if a molding pressure of between about 0.1 and about 100 metric tons per square centimeter.

The substances are molded, preferably into plates with a thickness of approximately 0.5 to 5 mm, and preferably approximately 1 to 3 mm.

According to another embodiment of the invention, the size of the plates is set during molding to between approximately 1 and 10,000 square centimeters.

An advantageous application of the catalyst comprises its use in the form of plates or corrugated plates at specified intervals in integrated units or cassettes, for the creation of a free-passage catalyst unit. The cassettes can exhibit corrugated spacer plates to separate the catalyst, present in the form of plates. This configuration results in infinitely long slits. The cassettes are appropriately combined to form complete reactors.

In the preparation of the catalyst using sulphuric acid as the bonding agent, the above-described process of FIGS. 3 to 5 may be used with the exception that sulphuric acid is used therein in place of the phosphoric acid or other phosphate acid.

The invention as described hereinabove in the context of the preferred embodiments is not to be taken as limited to all of the provided details thereof, since modifications and variations thereof may be made without departing from the spirit and scope of the invention.

What is claimed is:

1. A molded catalyst plate for the reduction of at least one contaminant in exhaust gases, said catalyst plate comprising:
   a first component comprising a sulphuric acid binder and a member chosen from the group consisting essentially of:
   (1) $Cr_2O_3$, and
   (2) a mixture of $Cr_2O_3$ and $Fe_2O_3$; and
   a second component comprising a phosphoric acid binder and a member chosen from the group consisting essentially of:
   (1) $Cr_2O_3$, and
   (2) a mixture of $Cr_2O_3$ and $Fe_2O_3$.

2. The catalyst plate according to claim 1, wherein said catalyst plate additionally comprises alternating layers of said first and second components and wherein the outer layers of said catalyst plate comprise said first component.

3. The catalyst plate according to claim 1, wherein said $Cr_2O_3$ and said $Fe_2O_3$ are both in granular form.

4. The catalyst plate according to claim 2, wherein said $Cr_2O_3$ and said $Fe_2O_3$ are both in granular form.

5. The catalyst plate according to claim 1, further comprising a doping agent added to at least one of said first and second components.

6. The catalyst plate according to claim 2, further comprising a doping agent added to at least one of said first and second components.

7. The catalyst plate according to claim 3, further comprising a doping agent added to at least one of said first and second components.

8. The catalyst plate according to claim 4, further comprising a doping agent added to at least one of said first and second components.

9. The catalyst plate according to claim 5, wherein said doping agent is at least one member chosen from the group consisting essentially of $V_2O_5$, $WO_3$, $Nb_2O_5$, MnO and other members of the group.

10. The catalyst plate according to claim 1, wherein said mixture of said first component of $Cr_2O_3$ and $Fe_2O_3$ is mixed in a ratio of about 1:4 parts by weight and 80% sulphuric acid is added to the mixture to the amount of about 0.2 parts by weight.

11. The catalyst plate according to claim 1, wherein said mixture of said second component of $Cr_2O_3$ and $Fe_2O_3$ is mixed in a ratio of about 1:4 parts by weight and 70% phosphoric acid is added to the mixture to the amount of about 0.2 parts by weight.

12. The catalyst plate according to claim 10, wherein said mixture of said second component of $Cr_2O_3$ and $Fe_2O_3$ is mixed in a ratio of about 1:4 parts by weight and 70% phosphoric acid is added to the mixture to the amount of about 0.2 parts by weight.

13. A process for the manufacture of a molded catalyst plate for use in the reduction of at least one contaminant in exhaust gases, said process comprising the steps of:
   (a) selecting a first catalytic agent comprising a member chosen from the group consisting essentially of:
   (1) $Cr_2O_3$, and
   (2) a mixture of $Cr_2O_3$ and $Fe_2O_3$;
   (b) treating said first catalytic agent with a sulphuric acid binder to produce a first component;
   (c) selecting a second catalytic agent comprising a member chosen from the group consisting essentially of:
   (1) $Cr_2O_3$, and
   (2) a mixture of $Cr_2O_3$ and $Fe_2O_3$;
   (d) treating said second catalytic agent with a phosphoric acid binder to produce a second component; and
   (e) molding said catalyst plate from said first and second components produced by said steps (b) and (d), respectively.

14. The process according to claim 13, wherein said molding step (e) is carried out so as to produce one of said catalyst plates having alternating layers of said first and second components, the outer layers of said one of said catalyst plates comprising said first component.

15. The process according to claim 13, wherein said $Cr_2O_3$ and $Fe_2O_3$ are both in granular form.

16. The process according to claim 13, further comprising the additional step of adding a doping agent to at least one of said first and second components.

17. The process according to claim 14, further comprising the additional step of adding a doping agent to at least one of said first and second components.

18. The process according to claim 16, wherein said doping agent is at least one member chosen from the group consisting essentially of $V_2O_5$, $WO_3$, $Nb_2O_5$, $MnO$ and other members of the group.

19. The process according to claim 17, wherein said doping agent is at least one member chosen from the group consisting essentially of $V_2O_5$, $WO_3$, $Nb_2O_5$, $MnO$ and other members of the group.

20. A process for the manufacture of a molded catalyst plate for use in the reduction of at least one contaminant in exhaust gases, said process comprising the steps of:
  (a) selecting a first catalytic agent comprising a member chosen from the group consisting essentially of:
    (1) granular $Cr_2O_3$, and
    (2) a mixture of granular $Cr_2O_3$ and granular $Fe_2O_3$;
  (b) treating said first catalytic agent with a sulphuric acid binder to produce a first component;
  (c) selecting a second catalytic agent comprising a member chosen from the group consisting essentially of:
    (1) granular $Cr_2O_3$, and
    (2) a mixture of granular $Cr_2O_3$ and granular $Fe_2O_3$;
  (d) treating said second catalytic agent with a phosphoric acid binder to produce a second component;
  (e) adding a doping agent to at least one of said first and second components, said doping agent being at least one member chosen from the group consisting essentially of $V_2O_5$, $WO_3$, $Nb_2O_5$, $MnO$ and other members of the group; and
  (f) molding said catalyst plate from said first and second components produced by said steps (b) and (d), respectively.

* * * * *